United States Patent Office 3,397,586
Patented Aug. 20, 1968

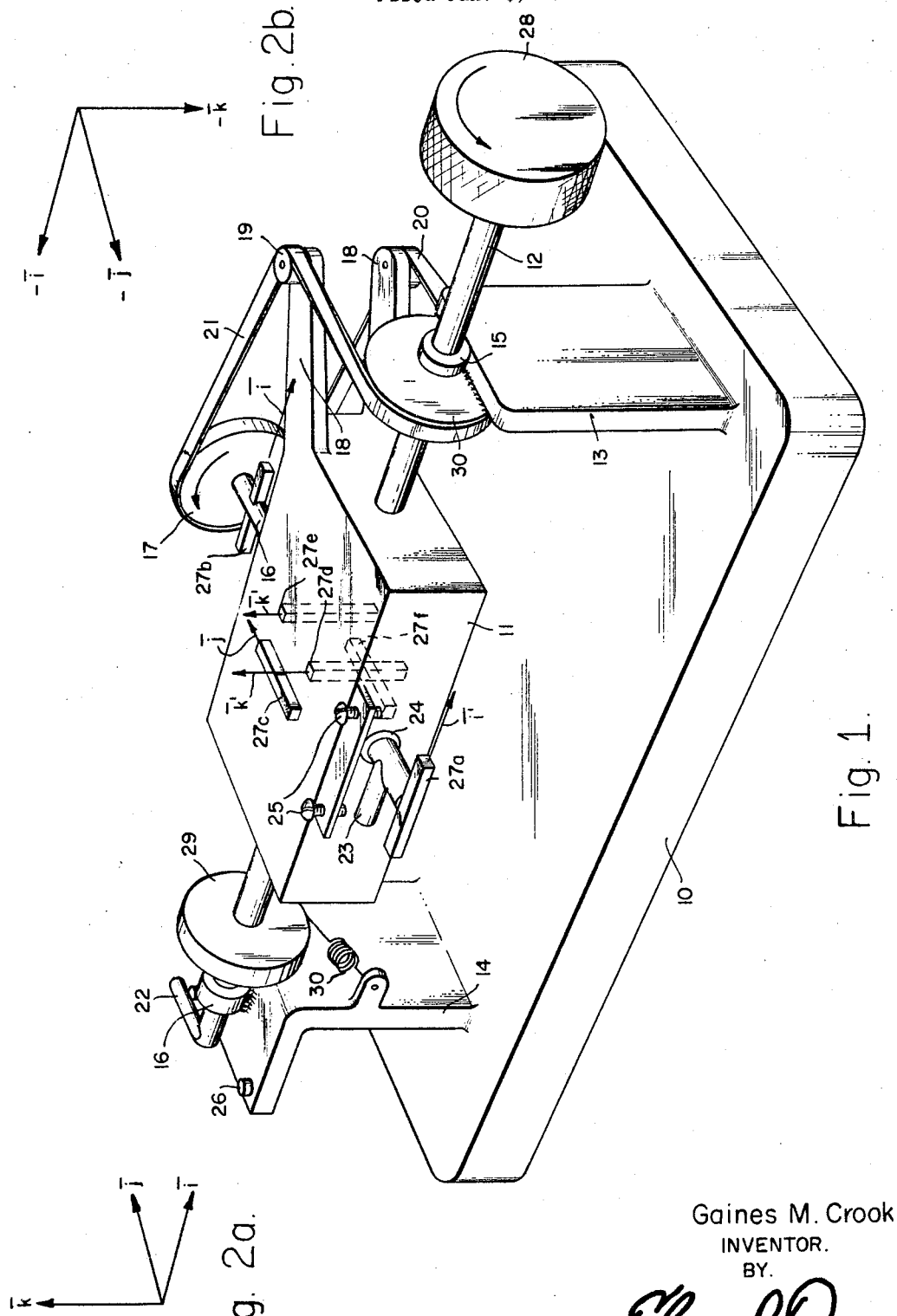

3,397,586
THREE-AXIS REVERSIBLE SENSOR MOUNT
Gaines M. Crook, Canoga Park, Calif., assignor to TRW Inc., Redondo Beach, Calif., a corporation of Ohio
Filed Jan. 5, 1967, Ser. No. 607,445
5 Claims. (Cl. 74—96)

ABSTRACT OF THE DISCLOSURE

This invention pertains to a three-axis reversible sensor mount wherein a frame is supported for rotation about the axis of the shaft. Sensors are mounted on the frame with their sensing axes mutually orthogonal with the axis of the shaft. A second shaft, perpendicuar to the first shaft, is rotatably attached to the frame. A pulley, fixedly attached to the second shaft, is driven by a belt which passes over a second pulley that is mounted on the first shaft and is held fixed relative to rotation of the first shaft. Sensors are mounted on the second shaft with their sensing axes parallel to the axis of the first shaft and mutually orthogonal to the axes of the sensors mounted on the frame such that the sensing axis of the sensors form a set of cartesian coordinates. A rotation of the first shaft 180° effectively reverses each sensor's sensing axis along their respective cartesian coordinate axes.

Background of the invention

This invention has particular application to the measurement of small magnetic fields in the order of one gamma ($10^{-5}$ Gauss). One of the many difficulties involved in measuring a magnetic field of this magnitude is that a volume of controlled magnetic field is required as an environment for the measurement and as a condition for calibration of the measuring instrument. The controlled environment may consist of a Helmholz coil, or it could be a magnetically shielded enclosure called a flux tank. The magnetic flux gate measuring system is one of the most sensitive systems for measuring vector fields; however, this device suflers somewhat from an offset near zero field. Offset in a system such as this may be measured by reversing magnetic sensor physically and computing the difference in indicated field values. If the measurement is made in a flux tank, the offset will include the perm effect of the flux tank. It is permissible to have a perm in the flux tank if its value is known within a degree of confidence. It has been found that if the offset is to be measured, it must be done without opening the flux tank, for after exposure to ambient earth fields, an entirely different perm condition can exist. The problem has been partially solved by the design of a simple pivoted mechanical mount which pivots a single probe 180° without opening the flux tank. This is acceptable for the calibration of single-axis systems but is of no use for calibrating a three-axis or tripole system. The problem, therefore, is to reverse the three vectors of a right orthogonal system with one comparatively simple motion without opening the flux tank.

Summary of the invention

A set of cartesian coordinates can be defined by the intersection of two perpendicular planes, generally designated the $j$–$k$ plane and the $i$–$k$ plane. Reversal of the sensing axes of sensors placed along the $i$, $j$ and $k$ axes can be accomplished by rotating each one of the planes about axes that are perpendicular to the plane. The sensing axes can therefore be reversed by rotating the planes of the sensing axes about two perpendicular axes. In order to rotate the two planes with one motion, it is necessary to couple the rotational motion of one plane to the other plane. Because the sensors take up physical space, they cannot all be located at the origin of the cartesian set of coordinates. Reversal of the sensors will therefore cause a physical translation to a new position, which will be parallel to the old position. This translation can cause difficulty in situations where severe gradients are present, these elements can be mounted in such a way that as each reversal is effected, the two elements exchange places, thereby averaging their outputs and effectively negating any effect of the physical translation. Each pair of sensors should therefore be symetrically mounted about their axis about which they are to be rotated. Because any type of magnetic flux measuring system is very sensitive to electric currents, it is not possible to utilize electrical actuators or to rotate the axis with electrical servo motors. The particular use of the device requires that mechanical linkages made from nonmagnetic materials be used. It is also desirable to provide the device with adjustable mechanical stops such that an accurate reversal of the sensing axes can be obtained repeatedly. If electrical devices were used to sense the final positions of the axes, they would be subject to offset conditions caused by changes in temperature, variations in power supplies, etc.

It is therefore an object of the present invention to provide a new and novel device for reversing three orthogonal axes.

It is another object of the present invention to provide a device wherein three orthogonal axes may be reversed with one input motion.

It is another object of the present invention to provide a device for reversing the axes of a plurality of non-parallel sensors.

In a preferred form of the present invention, the foregoing objects are achieved by rotatably mounting a frame to a base by means of a shaft. Sensors are mounted to the frame orthogonal to the axis of the shaft and to each other. A second shaft is rotatably mounted with respect to the frame along an axis which is perpendicular to the axis of the first shaft. Sensors are mounted to the second shaft perpendicular to its axis. A first pulley is affixed to the second shaft and a second pulley is symmetrically mounted about the first shaft and fixedly attached to the base member. A pair of idling pulleys are mounted to the frame between the first and second pulleys with their rotational axes perpendicular to the rotational axes of the first and second shaft. A continuous belt passes over the pulleys and transmits rotations of the first shaft to the second shaft, effectively reversing the position of the sensor mounted to the second shaft and the sensors mounted to the frame when the first shaft is rotated 180°.

The aforementioned and other objects of the present invention will become more apparent when taken in conjunction with the following description and drawings in which:

Brief description of the drawings

FIGURE 1 illustrates the preferred embodiment of the present invention in isometric projection form; and FIGURES 2a and 2b illustrate in vector form the rotation of the axes of the embodiment of FIGURE 1.

Description of the preferred embodiments

Referring to FIGURE 1, a base member 10 which may be made from some non-ferrous type material such as brass, wood or plastic, provide a rigid support for the vertical bearing holding members 13 and 14. A shaft 12 is mounted to the vertical members 13 and 14 by means of bearings members 15 and 16, respectively, the axes of the bearings defining a first axis of rotation. The shaft 12 has a perpendicular stop member 22 mounted to one end which limits the angular travel of the shaft 12 to approximately 180°. Limiting screws 26 passing through the vertical member 14 provide a vernier adjustment such that the shaft 12 can only be rotated 180°. A knob 28 is mounted to the other end of shaft 12 to facilitate its rotation. This knob may be actuated by hand or in remote applications such as those encountered in a spacecraft; it may be actuated by means of a pneumatic tube such as a Bourdon tube, which is partially wound around the knob and upon the application of air or gas pressure from a reserve vessel, the expansion or straightening out of the tube will rotate the knob a fixed amount. A frame member 11 is fixedly mounted in a substantially central position on the shaft 12. A second shaft 16 passes through the frame member 11 and is supported for rotation by means of bearings 24 in the frame. The shaft 16 defines a second axis of rotation coincident along its longitudinal axis. The second axis of rotation is substantially perpendicular to the axis of shaft 12. A pair of idler pulley supports 18, project from a corner of the frame member 11. Idler pulleys 19 and 20 are positioned on the support members 18 with their rolling axes perpendicular to the axes of shafts 12 and 16. A pulley 17 is fixedly attached to the shaft 16. Another pulley 30 is fixedly attached to the vertical member 13 with the shaft 12 passing freely through its center. Projecting from shaft 16 in a perpendicular direction is the perpendicular stop member 23. The stop member rests against the vernier adjusting screws 25, which are adjusted to provide 180° of angular freedom to the shaft 16. A continuous belt 21 passes over pulleys 30 and 17, and the idler pulleys 19 and 20, coupling rotations of the frame 11 about the first axis to the second axis via the pulley 17. To ensure that the second axis is rotated exactly 180° for a 180° rotation of shaft 12, it is desirable to make pulley 30 with a larger diameter than pulley 17. Also, to ensure that the second axis is rotated and held against the stops 25, the continuous belt 21 may be made of rubber or some other elastic material that stretches slightly. In operation then, when the perpendicular stop member 23 hits the vernier stop set screws 25 in either position, there will still be some angular rotation left in shaft 12 before its stop member 22 contacts the stop screws 26. Forcing the shaft 12 to its stop position will ensure that shaft 16 has rotated its full 180°.

Magnetic field sensors 27a and 27b, having an axis along which they sense magnetic fields, have their sensitive axes designated by an $\bar{i}$ and $\bar{i}'$, respectively, are mounted with these sensitive axes perpendicular to the second rotational axis of shaft 16 and substantially parallel to the first rotational axis of shaft 12. The magnetic sensors 27a and 27b are also mounted symmetrically on opposite sides of the shaft 12 so that when the shaft is rotated 180°, the magnetic sensors are transposed in position. Magnetic sensors 27d and 27e are positioned such that their sensitive axes $\bar{k}$ and $\bar{k}'$ are perpendicular to the first rotational axes and also perpendicular to the sensing axis of magnetic sensors 27a and 27b. Magnetic sensors 27d and 27e are symetrically positioned about the first rotational axis of shaft 12. Magnetic sensors 27c and 27f (shown in dotted lines), have their sensing axes $\bar{j}$ and $\bar{j}'$ mutually orthogonal to the sensing axis of sensors 27a, 27b, 27d and 27e. Magnetic sensors 27c and 27f are positioned on the frame 11 symmetrically disposed with respect to the shaft 12.

A pulley 29 is fixedly attached to the shaft 12 between the bearing 16 and the frame 11. A spring 30 is connected to the pulley 29 and exerts a tangential force on the pulley to restore shaft 12 to a resting position. Spring 30 is particularly adaptable when a remote rotational source such as the previously mentioned Bourdon tube is used to rotate the knob 28. When the pressure is removed from the Bourdon tube, the spring takes over and coerces the shaft 12 back to the rest position.

Referring now to FIGURES 2a and 2b, the coordinate vector axes of the magnetic sensors 27 are designed by $i$, $j$ and $k$. These axes form a right orthogonal coordinate system. When shaft 12 is rotated fully counterclockwise, the magnetic sensing vectors are reversed. FIGURE 2b illustrates this positioning of the reversed magnetic sensing axes designated $-i$, $-j$ and $-k$. Pairs of sensors are used to minimize any offsets that may occur due to the translatory shift in position, but it would be obvious to those persons skilled in the art that the invention would also function satisfactorily if single sensors were used.

In summary, the invention provides a reversal of three mutually orthogonal sensor axes with one simple motion. Translatory effects are also minimized by allowing dual sensing elements to exchange places and thereby provide an averaging effect at the sensor's output. With one simple motion required to reverse to all three orthogonal axes, a pneumatic type actuator may be used effectively, simplifying the operation of the device. The device finds particular application as a magnetometer mount aboard spacecrafts, wherein the probe offsets may be taken into account. Vibrations encountered during launch of a space vehicle can change the offset of the probe from the value seen during the calibration on earth. Under some conditions, this offset could also change in space. A small pressure device such as a gas bottle containing compressed gas, can activate a Bourdon tube to provide reversals of the device.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:
1. In combination:
   a base;
   a frame;
   a shaft rotatably mounting said frame to said base about a first axis;
   first and second sensor means mounted to said frame with their sensing axes orthogonal with respect to each other and said first axis;
   a second shaft orthogonal to said first shaft and rotatable about a second axis;
   a third sensor means mounted to and orthogonal with said second shaft;
   a first pulley fixedly connected to said second shaft;
   a second pulley mounted with said first axis passing substantially through its center and fixed to said base; and
   coupling means coupling said first pulley to said second pulley such that rotations of said first shaft cause rotations in said second shaft.

2. The invention according to claim 1, wherein said coupling means is comprised of:
   a pair of idler pulleys rotatably mounted to said frame; and
   a belt passing over said first, second and idler pulleys.

3. The invention according to claim 2, wherein said first pulley has a larger diameter than said second pulley.

4. The invention according to claim 2, wherein said belt is an elastic belt.

5. The invention according to claim 1 and further comprising:
   stop means mounted to said frame and said base limiting rotations of said first and second shafts to substantially 180°.

References Cited
UNITED STATES PATENTS 3,220,267   11/1965   Smith _____ 74—96 XR
3,334,796   8/1967   Trott _____ 74—96 XR FRED C. MATTERN, Jr., *Primary Examiner.*

F. D. SHOEMAKER, *Assistant Examiner.*